United States Patent [19]

Otsuki et al.

[11] Patent Number: 4,967,999
[45] Date of Patent: Nov. 6, 1990

[54] FLOW PASSAGE COUPLING UNIT

[75] Inventors: Noboru Otsuki, Akashi; Toshihiko Oonishi, Kakogawa; Katsumi Tomioka, Kobe; Kozo Miura, Hiroshima, all of Japan

[73] Assignee: Nippon Air Brake Kabushiki Kaisha, Kobe, Japan

[21] Appl. No.: 442,095

[22] Filed: Nov. 28, 1989

[51] Int. Cl.$^5$ .............................................. F16L 37/28
[52] U.S. Cl. ............................................... 251/149.7
[58] Field of Search .................... 251/149.7, 149.6; 137/614.03

[56] References Cited

U.S. PATENT DOCUMENTS

| 2,880,960 | 4/1959 | Kurt | 251/149.7 |
| 4,371,004 | 2/1983 | Sysolin et al. | 137/614.04 |

FOREIGN PATENT DOCUMENTS

| 2946055 | 5/1981 | Fed. Rep. of Germany | 251/149.6 |
| 255051 | 10/1927 | Italy | 251/149.6 |
| 181874 | 6/1922 | United Kingdom | 251/149.6 |

Primary Examiner—A. Michael Chambers
Attorney, Agent, or Firm—Armstrong, Nikaido, Marmelstein, Kubovcik & Murray

[57] ABSTRACT

A flow passage coupling unit is provided for connection and disconnection of pipings e.g. on a tooling die exchanger of a press or a former machine, in which both the cylindrical body and the valve head of a slide valve actuated for communication and discommunication between flow paths are slidably fitted into the small and large diameter bores of a main body respectively which is designated as a housing for the slide valve, so that the sliding distance of the slide valve can be determined by summing up of the sliding lengths of their respective small and large diameter bores. Accordingly, the entire length of the main body is minimized and thus, the flow passage coupling unit will become compact in size while assuring consistent action in coupling the flow passages. Also, the flow passage coupling unit is further reduced in the overall size by improving both the sealing arrangement in the sliding regions and the opening arrangement in the cylindrical body.

6 Claims, 6 Drawing Sheets

FLOW PASSAGE COUPLING UNIT

BACKGROUND OF THE INVENTION

The present invention relates to a flow passage coupling unit for connection and disconnection of pipings e.g. on a tooling die exchanger device of a press or a forming machine.

Figure 8:
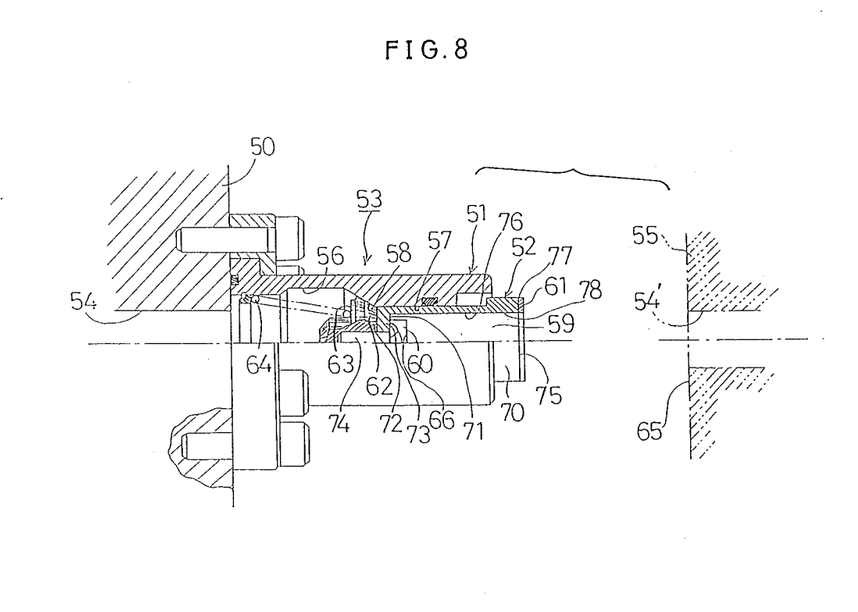
FIG. 8 is a primary section partially cross sectional view of a prior art flow passage coupling unit.

There has been known such a prior art flow passage coupling unit shown in FIG. 8 (also disclosed in Japanese Utility Model Pre-examined Publication No. 167888/1985).

The prior art flow passage coupling unit is arranged in which a first coupling component 53 cosisting of a main body 51 and a slide valve 52 is mounted to an instrument 50 which is supportedly provided for forward and backward movement (leftward and rightward of FIG. 8) and for connection with a piping at the other end, and another instrument 55 which acts as a second coupling component 55 having a coupling surface 65 thereof where a flow path 54' is made open, is disposed opposite to the first coupling component 53 as represented by the chain line of FIG. 8.

The main body 51 of the first coupling component 53 which is fixedly supported by the instrument 60, incorporates a large diameter bore 56 communicated with a flow path 54 in the instrument 50, a small diameter bore 57 into which the slide valve 52 is slidably fitted, and a valve seat 58 provided in the form of a tapered surface (of conical configuration) between the large and small diameter bores 56 and 57.

The slide valve 52 comprises a cylindrical body 70 and a valve head 63 fixedly mounted to a rear end wall 73 of the cylindrical body 70. The slide valve 62 is kept urged by a spring 64 installed in the large diameter bore 56 so that its valve head 63 can be seated on the valve seat 58. The valve head 63 includes a seal member 62 arranged in contact with the valve seat 58 and is joined by a bolt 74 to the rear end wall 73 of the cylindrical body 70. The cylindrical body 70 incorporates a rear end surface 72 and a front end surface 71 which constitute the rear end wall 73 and has a through hole 60 provided therein adjacent to the rear end wall 73 for communicating with the large diameter bore 56 when the valve head 63 is unseated. There is a fluid passage bore 59 communicated with the through hole 60 and at the other end, arranged open in an end surface 75 of the cylindrical body 70 to define an opening end 78. The end surface 75 is provided with a resilient seal member 61 of rectangular shape in cross section having a uniform thickness and bonded around the opening end 78 to the area thereof which is defined by an inner wall 76 of the fluid passage bore 59 and an outer wall 77 of the cylindrical body 70.

According to the above arrangement in the prior art flow passage coupling unit, compressed air supplied from the flow passage 54 to the large diameter bore 56 remains trapped within the large diameter bore 56 as the valve head 63 and the valve seat 58 abut each other for closing. Then, the instrument 50 is advanced to cause the resilient seal member 61 of the slide valve 52 to press against the coupling surface 65 of the instrument 55. When a greater force of pressure is exerted on the instrument 50 than the sum of an air pressure on the slide valve 52 and a yielding force of the spring 64, the slide valve 52 moves relatively to the backward. The seal member 62 on the valve head 63 then departs from the valve seat 58 and the through hole 60 in the cylindrical body 70 becomes communicated with the large diameter bore 56. As the through hole 60 is unclosed to the large diameter bore 56, the pressure by the compressed air exerted on the valve head 63 is released while the yielding force of the spring 64 remains. As the instrument 50 advances further towards the instrument 55, the communication between the through hole 60 and the large diameter bore 56 is enhanced corresponding to the distance of movement. When the through hole 60 is completely open to the large diameter bore 56, the flow paths 54 and 54' will be communicated with each other.

The cylindrical body 70 of the slide valve 52 in the flow passage coupling unit can slide through the small diameter bore 57 in the main body 51 while the valve head 63 of the slide valve 52 has no contact with the inner side of the large diameter bore 56 of the main body 51 after departing from the valve seat 58. Accordingly, the stable movement of the slide valve 52 during flow passage connection depends on the distance L of axial sliding of the cylindrical body 70 through the small diameter bore 51. The sliding distance L is preliminarily determined so that its ratio to the diameter D of the cylindrical body 70 is more than a specified rate. More particularly, it is necessary for assuring the stable movement of the slide valve 52 to lengthen the sliding distance L in relation to the diameter D in order to keep the ratio greater than the specified rate if the diameter D of the cylindrical body 70 is somewhat large. Consequently, the relative sliding distance L to the diameter D of the cylindrical body 70 has to be increased to ensure the area of satisfactory fluid passing for the purpose of reducing resistance to flow. Thus, the disadvantage is that the axial length of the small diameter bore 57 increases and the entire coupling unit becomes great in axial length.

Summary of the Invention

The present invention is directed to overcome the above problems towards improved technical means in the form of a flow passage coupling unit. The flow passage coupling unit comprises a first coupling component mounted to an instrument arranged for relative movement and a second coupling component having a coupling surface thereof where a flow path is made open and disposed opposite to the first component. The first component incorporates a large diameter bore and a small diameter bore both provided in a main body thereof. Between the large and small diameter bores there is provided a valve seat. The small diameter bore is arranged to accommodate a slide valve formed by joining a cylindrical body slidably fitted in the small diameter bore with a valve head provided for being seated on the valve seat. The cylindrical body of the slide valve has a fluid passage bore therein, an opening end provided in an end surface thereof where the fluid passage bore is made open, and a through hole provided therein for communicating with the large diameter bore when the valve head is unseated. The end surface of the cylindrical body is provided with a resilient seal member attached thereto around the opening end. Particularly, the valve head of the slide valve is slidably fitted into the large diameter bore so as to allow its outer periphery to provide a passage of flow for assuring the operation of the coupling unit.

Additionally, a resilient seal member is provided between the cylindrical body of the slide valve and the small diameter bore of the first coupling component body.

Furthermore, the cylindrical body of the slide valve has an annular recess provided circumferentially in the outer periphery thereof and extending adjacent the valve head. The through hole is then allocated in the annular recess.

Accordingly, since the valve head of the slide valve is slidably fitted into the large diameter bore of the first coupling component body, the sum of an axial length of the small diameter bore through which the cylindrical body slides and a length of the sliding surface of the large diameter bore through which the valve head slides can be designated as a proportionally relative sliding distance to the diameter of the cylindrical body. Even if the axial length of the small diameter bore is short, the sum of length can still be regarded as a relative length to the diameter of the cylindrical body by adding a length compensating for the short of length to the sliding surface length of the valve head. Also, if the diameter of the cylindrical body is great, the axial length of the first coupling component can be shortened with the axial length of the small diameter bore remaining unchanged.

Additionally, the resilient seal member is provided between the cylindrical body of the slide valve and the sliding surface of the small diameter bore in order to prevent leakage of compressed air from between the cylindrical body and the sliding surface of the small diameter bore. Thus, there is no need to have the sliding surface of the cylindrical body lengthened for increase of sealing effect and instead, the sliding surface of the valve head can be lengthened by a corresponding distance. Consequently, the axial length of the small diameter bore can be reduced and thus, the first coupling component in the arrangement can itself be reduced in the axial length.

Furthermore, the annular recess formed in the outer periphery of cylindrical body is provided adjacent to the Valve head of the slide valve with the through hole therein so that when the valve head is moved off the vale seat, the annular recess adjacent to the valve head can allow the through hole to communicate with the large diameter bore. The effective opening area will then increase more sharply as compared with the displacement of the valve head. More specifically, a size of the opening area required in the coupling unit can be obtained by a small displacement of the valve head even if the through hole becomes open not sufficiently to the large diameter bore. Consequently, the movement of the valve head can be minimized and the axial length of the large diameter can be shortened. This allows the first coupling component in the arrangement to become shorter in the axial length.

Brief Description of the Drawings

FIGS. 1 through 7 illustrate preferred embodiments of the prevent invention, in which.

Preferred Embodiments of the Invention

Preferred embodiments of the present invention will be described with reference to the accompanying drawings.

Figure 1:
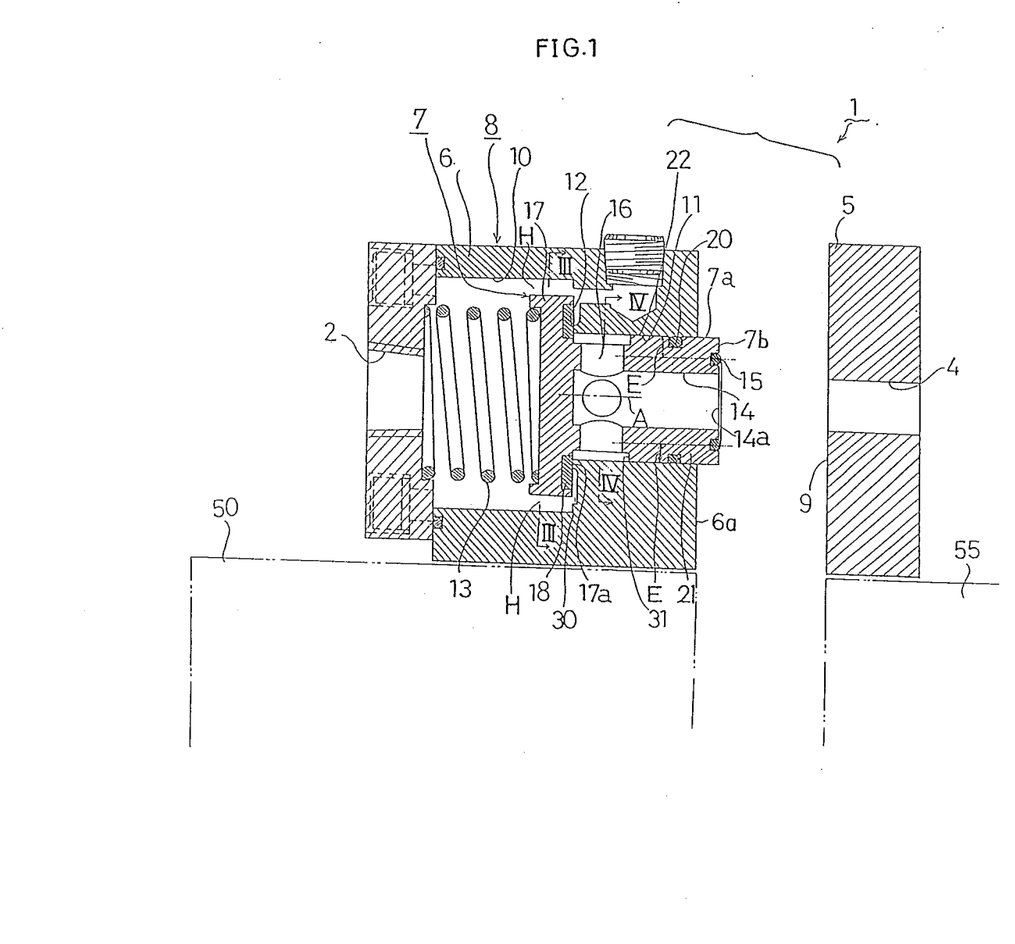
FIG. 1 is a longitudinal cross sectional side View of a flow passage coupling unit according to the present invention which is disconnected.

As shown in FIG. 1, a flow passage coupling unit 1 according to the present invention is provided in which a first coupling component 8 comprising a main body 6 and a slide valve 7 is mounted on an instrument 50 capable of moving forward and backward (leftward and rightward of FIG. 1) while a second coupling component 5 having a coupling surface 9 thereof where a flow path 4 is made open is fixedly mounted to another instrument 55 so that the coupling surface 9 of the second coupling component 5 comes opposite to the outward front end 7h of the slide valve 7.

The main body 6 of the first coupling component 8 has a large diameter bore 10 and a small diameter bore 11 both provided therein and a valve seat 12 formed between the large and small diameter bores 10 and 11. The large diameter bore 10 is at the rear end closed with a lid 3 which has a flow path 2 provided therein for communication with an exterior piping and communicated with the flow path 12. The slide valve 7 includes a cylindrical body 21 slidably fitted in the small diameter bore 11. There is a spring 13 installed in the large diameter bore 10 for urging a seal member 18 of the slide valve 7 against the valve seat 12. The valve seat 12 is situated around an opening between the large and small diameter bores 10 and 11. A recess 30 is provided at the large diameter 10 side around the valve seat 12 which is thus formed of inverted U-shape in cross section as shown in FIG. 1. Accordingly, when the seal member 18 on a valve head 17 is pressed by a pressure of compressed air in the large diameter bore 10, its pressing force will increase in strength per area to assure tight sealing. The spring 13 yields a pressing force enough to keep the valve head 17 pressed against the valve seat 12 then the air pressure is absent in the large diameter bore 10.

Figure 4:
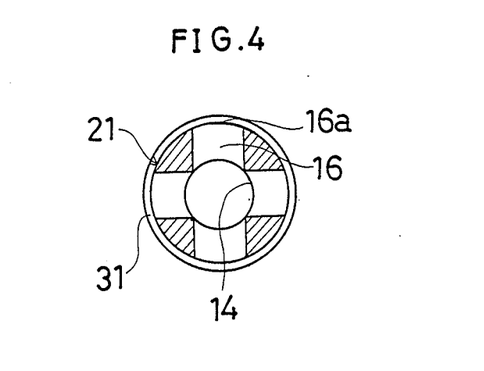
FIG. 4 is a cross sectional view taken along the line IV–IV of FIG. 1.
Figure 5:
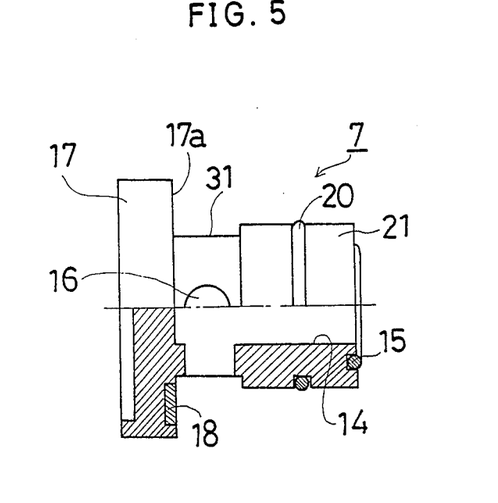
FIG. 5 is a partially broken cross sectional view explaining the arrangement of a slide valve.

The slide valve 7 of the first coupling component 8 is constituted by joining the valve head 17 at a right angle to the cylindrical body 21 movably fitted into the small diameter bore 11. The cylindrical body 21 is provided with a fluid passage bore 14 extending axially thereof to its opening end 14a rendered open in the front end 7b and a through hole 16 extending at a right angle thereto adjacent to the seal member 18. The front end 7b of the cylindrical body 21 protrudes more than the front end 6a of a first coupling component 8 on the side of a second coupling component 5. As best shown in FIG. 4, the through hole 16 comprises four openings extending across the cylindrical body 21 at right angles to the fluid passage bore 14 and its opening ends 16a in the wall of the cylindrical body 21 are communicated with one another by an annular recess 31 proVided circumferentially of a sliding surface 7a on the cylindrical body 21. The annular recess 31 is formed in the circumferential periphery of the cylindrical body 21 adjacent to the seating surface 17a of the valve head 17, as shown in FIG. 5, so that when the valve head 17 is displaced from the valve seat 12, the fluid passage bore 14 can communicate to the large diameter bore 10 before the displacement of the valve head 17 comes equal to the diameter of the through hole 16. A resilient seal member is mounted on the sliding surface 7a of the cylindrical body 21 in order to prevent leakage of compressed air from a slide region 22 between the cylindrical body 21 and the small diameter bore 11 wall. Also, a resilient seal member 15 having a diameter of d3 greater than the diameter d1 of the fluid passage bore 14 and smaller than the diameter d2 of the sliding surface 7a is mounted to the outward front end 7b of the cylindrical body 21. Accordingly, a strength for sealing between the front end 7b of the cylindrical body 21 and the coupling surface 9 of the second coupling component 5 can be produced by a pressure of compressed air acting on the area designated by a difference between d2 and d3.

The valve head 17 incorporates the seal member 18 having its seating surface 17a which will come into contact with the valve seat 12 of the main body 6. The large diameter bore 10 and the through hole 16 can thus be communicated with and discommunicated from each other by the movement of the seal member 18. The valve head 17 has four sliding surfaces 23 provided by rounding off the outer corners thereof for sliding along the inner wall of the large diameter bore 10. The other periphery of the valve head 17 than the sliding surfaces 23 define four passages H in the large diameter bore 10. Each passage H is formed of half-moon shape in cross section so that its cross sectional area is approximately equivalent to the opening of the fluid passage bore 14 in the cylindrical body 21 and the resistance to flow will be reduced during passing of the compressed air. It will be understood that as at least one of the passages H is needed on the periphery of the valve head 17, the remaining periphery may be assigned for the sliding surface 23 along the large diameter bore 10 and its cross sectional shape shown in FIG. 3 may also be altered as desired.

The operation in the embodiment will then be described.

Figure 2:
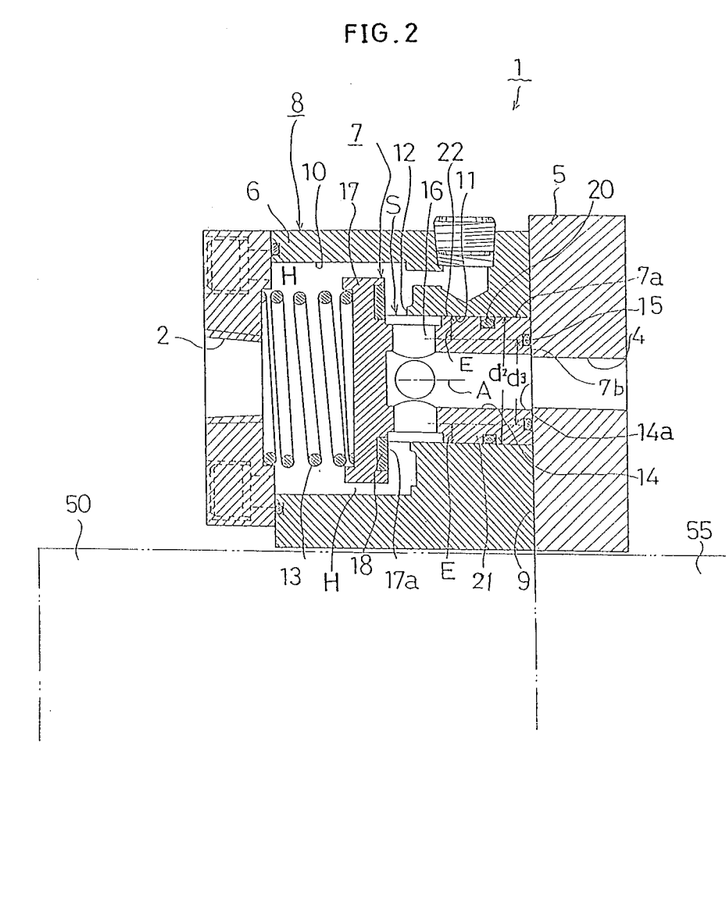
FIG. 2 is a longitudinal cross sectional view of the flow passage coupling unit being connected.
Figure 3:
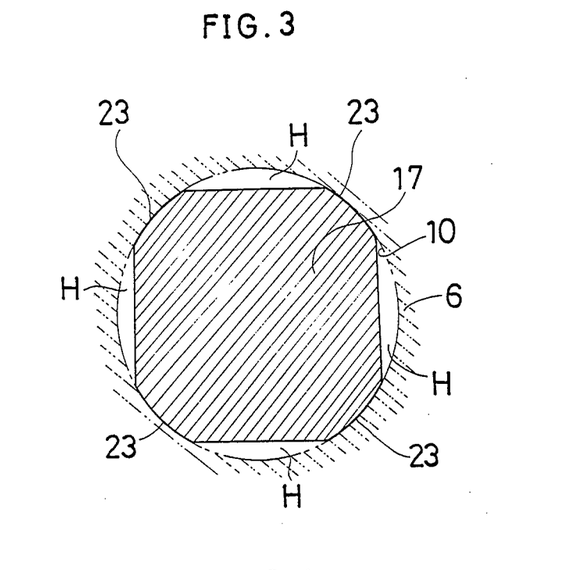
FIG. 3 is a cross sectional view taken along the line III—III of FIG. 1.
Figure 6:
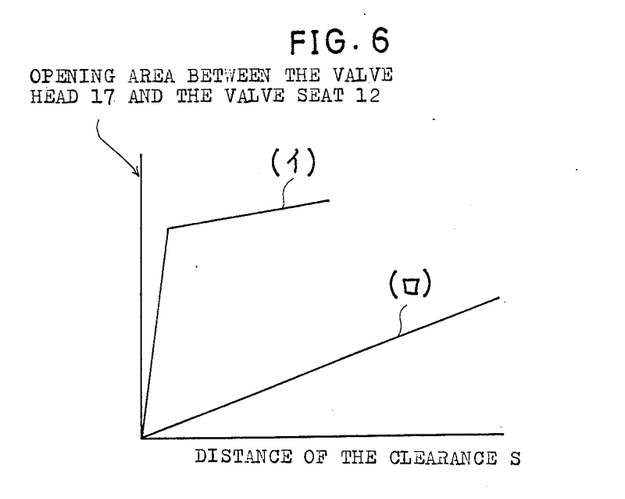
FIG. 6 is a characteristic diagram showing the relation between the clearance in the slide valve and the opening area.

When compressed air has been introduced through the flow path 2 to the arrangement in an illustrated state, it remains within the large diameter bore 10 because the valve head 17 is held urged by the spring 13 When the instrument 50 is moved forward, the seal member 15 on the front end 7b of the slide valve 7 comes in contact with the coupling surface 9 of the second coupling component 5 with the first coupling component 8 remaining in the state of FIG. 1. Then, when a greater pressure than the sum of a yielding force of the spring 13 and a pressure of the compressed air exerted on the area of valve seat 12 is applied to the instrument 50, the front end 7b of a cylindrical body 21, which has protruded from the front end 6a of the first coupling component 8, moves toward a small diameter bore 11, a valve head 17 of a slide valve 7 departs from a valve seat 12, providing the connection condition as shown in FIG. 2 the four sliding surfaces 23 of the valve head 17 remain contact with the inner wall of the large diameter bore 10 as shown in FIG. 3, the slide valve 7 is assuredly displaced from the valve seat 12 with the sliding surfaces 23 and 7a of their respective valve 17 and the cylindrical body 21 being sustained closely. After the departure of the valve head 17 from the valve seat 12 is completed, the communication between the large diameter bore 10 and the fluid passage bore 14 is strictly determined by a clearance S between the valve head 17 and the valve seat 12. Accordingly, as the opening between the valve head 17 and the valve seat 12 is expressed as the product of the clearance S (the displacement of the slide valve 7) and the circumferential length of the valve seat 12, it will increase in the size relative to the clearance S of a small stroke length as represented by a characteristic curve (a) of FIG. 6 illustrating the relation between the clearance S and the cross sectional area of the opening (while the same opening in the prior art increases gradually corresponding to the displacement of the slide valve 52 as represented by (b) of FIG. 6 because the through hole 60 becomes open to the large diameter bore 56 as the slide valve 52 moves backward). As the result, the flow path 2 in the instrument 50 is communicated with the flow path 4 in the second coupling component 5 via the large diameter bore 10, through hole 16, and fluid passage bore 14 and the compressed air remaining in the large diameter bore 10 will thus pass from the through hole 16 via the fluid passage bore 14 to the flow path 4 in the second coupling component 5.

During the coupling, the sealing between the front end surface 7b of the slide valve 7 and the coupling surface 9 of the second coupling component 5 is effected by the seal member 15 which is fixedly mounted closer to the center (in the axis A side) than the sliding surface 7a on the cylindrical body 21. Thus, the strength of sealing is applied in the sum of the yielding force of the spring 13 and a corresponding pressure of compressed air to the cross sectional area E determined by subtracting the cross section of the seal member 15 of d3 diameter from the area of d2 diameter defined by the sliding surface 7a. Accordingly, when the pressure of compressed air supplied from the flow path 2 is altered under the coupling condition of FIG. 2, the pressure exerted on the cross sectional area E varies and thus, the pressing force on the seal member 15 changes. Consequently, the resultant force for sealing is obtained at a constant rate between the front end surface 7b of the slide valve 7 and the coupling surface 9 and the close sealing effect will remain consistent.

Although this embodiment is provided in which the first coupling component 8 is mounted to the instrument 50 while the second coupling component 5 arranged opposite to the first coupling component 8 is disposed on the instrument 55, a reverse arrangement will be possible in which the first coupling component 8 is mounted to the instrument 55 while the second coupling component 5 is disposed on the instrument 50. Also, the second coupling component 5 may act as the same instrument 55 having the coupling surface 9 thereof where the flow path 4 is made open as in the prior art. Furthermore, the first coupling component 8 may be mounted directly to the instrument 50 without the cover 3 provided on the rear thereof in the same manner as of the prior art.

As set forth above, the flow passage coupling unit according to the present invention allows the slide valve 7 to be supported in both the large and small diameter bores because the valve head is mounted to the cylindrical body and fitted into the large diameter bore in the main body for sliding movement with its outer periphery. The sum of the axial length of the small diameter bore and the sliding surface length of the valve head which slides along the large diameter bore, can thus be assigned for a relative distance to the diameter required for assuring the stable movement of the slide valve. More particularly, the sliding surface length of the valve head is complemented by the axial extension of the small diameter bore resulting from an increase in the diameter of the cylindrical body with the incremental amount of passing flow. Thus, the first coupling component will substantially be less in the axial length than the prior art first coupling component.

In addition, the size of the large diameter bore is determined by the requirements that both the valve head and the spring for urging the valve head are installed therewithin, that the valve head can completely depart from the valve seat, and that the coils of the spring are adequately spaced from each other for passing the compressed air. Accordingly, there is always provided a clearance between the valve head and the right end of the cover throughout the stroking motion of the valve head. As the seal member is interposed between the cylindrical body of the slide valve and the sliding surface of the small diameter bore, there is no need to provide such an arrangement in which the small diameter bore accepting the cylindrical body to slide therealong is axially extended for enhancing the sealing effect. The first coupling component can thus be reduced in the axial length when the axial length of the small diameter bore is shortened, as compared with the previously described arrangement, by a specified distance which is in turn added to the outer sliding surface length of the valve head.

Furthermore, the annular recess incorporating the through hole is formed adjacent to the valve head of the slide valve and extends circumferentially of the cylindrical body of the same so that the effective opening area relative to the displacement of the valve head can increase a great rate of speed. More particularly, even when the valve head moves to a minimum, the size of the opening required in the coupling unit is obtained. Accordingly, the axial length of the large diameter can be shortened with the displacement of the valve head kept minimum as compared with the previously described arrangement and thus, the first coupling component will be reduced in the axial length.

Figure 7:
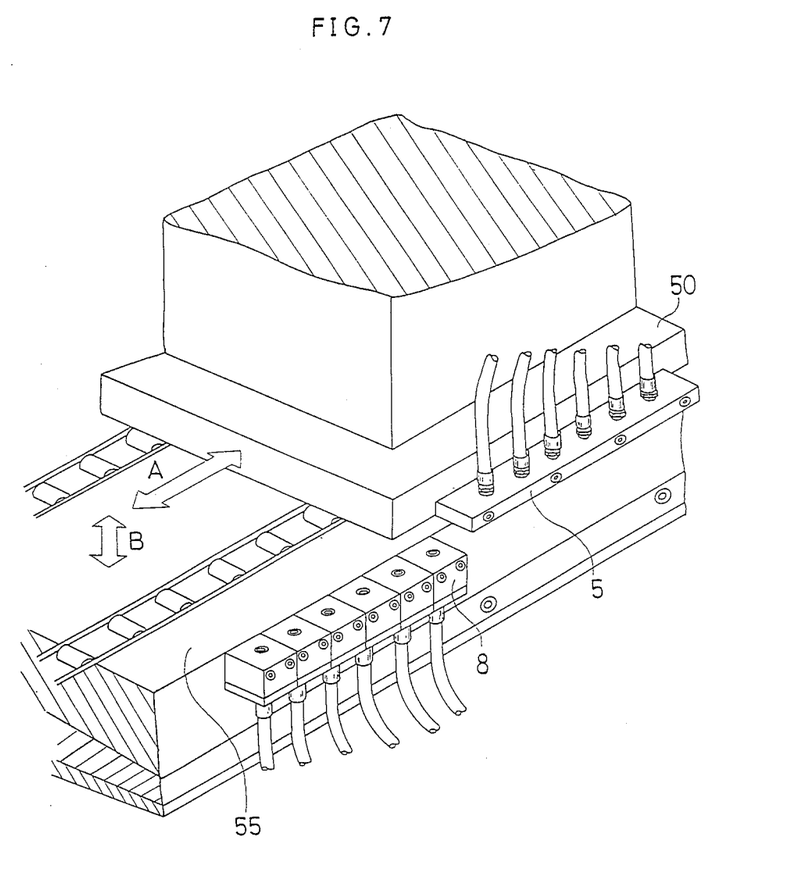
FIG. 7 is a perspective explanatory view showing a tooling die exchanger device in a pres machine which employs the flow passage coupling units of the present invention.

According to the flow passage coupling unit of the present invention, the first coupling component is kept short in the axial length thus to minimize its distance of movement needed for coupling with the second coupling component. In the case that the flow passage coupling unit is used e.g. with such a tooling die exchanger of a press machine as shown in FIG. 7, the movement of an elevator lift 50 can be minimum in the direction B represented by the arrow. In such an arrangement, a plurality of the first coupling components 8 are mounted in an array at predetermined exchange locations on a transfer bed 55 on which a tooling die is transferred while a series of the second coupling components 5 having the plurality of flow paths therein are fixedly mounted to the elevator lift 50 of tooling die exchange for engagement with the array of the first coupling components 8. When the elevator lift 50 is moved in the (horizontal) direction A denoted by the arrow of FIG. 7 to above the exchange position, the second coupling components join with the first coupling components 8 respectively to allow the plurality of air pipings to be communicated with each other at one time.

While the invention has been particularly shown and described in reference to preferred embodiments thereof, it will be understood by those skilled in the art that changes in form and details may be made therein without departing from the spirit and scope of the invention.

We claim:

1. A flow passage coupling unit comprising:
a first coupling component mounted to an instrument arrange for relative movement;
a second coupling component having a coupling surface thereof and a flow path passing therethrough, said second coupling component being disposed opposite to said first component, said first component having a main body with a large diameter bore and a small diameter bore and a valve seat provided between said large and small diameter bores, said large diameter bore and said small diameter bore having respective inner surfaces which are parallel to each other, said first coupling component having a slide valve with a valve head, said slide valve being accommodated within said small diameter bore and formed by joining a cylindrical body slidably fitted in said small diameter bore with said valve head, said valve head having a seal member being seated on said valve seat, said cylindrical body of said slide valve having a fluid passage bore formed therein, an opening end provided in an end surface thereof where a fluid passage bore is made open, and a through hole provided therein for communicating with said large diameter bore when said valve head is unseated from said valve seat, and said end surface of said cylindrical body being provided with a resilient seal member attached thereto around said opening end, in which said valve head of said slide valve is slidably fitted into said large diameter bore and simultaneously guided along said inner surfaces of said small and large diameter bores, the periphery of said valve head and the inner surface of said large diameter bore having a passageway therebetween and being partially in contact with each other to thereby provide a passage of flow along the periphery of said valve head for assuring the operation of the coupling unit.

2. A flow passage coupling unit as defined in claim 1, further comprising another resilient seal member provided between said cylindrical body of said slide valve and said small diameter bore in said first coupling component body.

3. A flow passage coupling unit as defined in claim 1 or 2 wherein said cylindrical body of said slide valve has an annular recess provided circumferentially in the outer periphery thereof and extending adjacent said valve head and said through hole is allocated in said annular recess.

4. A flow passage coupling unit as defined in claim 1, wherein said seal member and said valve seat form a gap therebetween when said second coupling component exerts pressure on said front end of said cylindrical body, said flow along the periphery of said slide valve being dependent on said gap and a circumferential size of said valve seat.

5. A flow passage coupling unit as defined in claim 1, further comprising a spring means operably coupled to said valve head for urging said seal member against said valve seat.

6. A flow passage coupling unit as defined in claim 1, wherein said opening end in an end surface of said slide valve where said fluid passage bore is made open extends beyond an end surface of said first coupling component near said second coupling component when said seal member is seated onto said valve seal.

* * * * *